United States Patent
Parthiban et al.

(10) Patent No.: US 8,429,678 B1
(45) Date of Patent: Apr. 23, 2013

(54) REDIRECTING VIDEO TO A REMOTE CLIENT USING A SERVICE PROCESSOR

(75) Inventors: Baskar Parthiban, Johns Creek, GA (US); Sanjoy Maity, Snellville, GA (US)

(73) Assignee: American Megatrends, Inc., Norcross, GA (US)

( * ) Notice: Subject to any disclaimer, the term of this patent is extended or adjusted under 35 U.S.C. 154(b) by 468 days.

(21) Appl. No.: 12/763,448

(22) Filed: Apr. 20, 2010

(51) Int. Cl.
*G06F 13/00* (2006.01)

(52) U.S. Cl.
USPC .............................. 719/323; 719/324; 345/545

(58) Field of Classification Search .................. 719/323, 719/324; 345/545
See application file for complete search history.

(56) References Cited

U.S. PATENT DOCUMENTS

| 5,748,866 | A * | 5/1998 | Edgar | 345/428 |
| 7,822,891 | B2 * | 10/2010 | McDonnell et al. | 710/56 |
| 2008/0005499 | A1 * | 1/2008 | McDonnell et al. | 711/154 |
| 2009/0322784 | A1 * | 12/2009 | Sartori | 345/619 |
| 2010/0271381 | A1 * | 10/2010 | Byford et al. | 345/547 |

* cited by examiner

*Primary Examiner* — Andy Ho
(74) *Attorney, Agent, or Firm* — Morris Manning & Martin, LLP; Tim Tingkang Xia, Esq.

(57) ABSTRACT

Technologies are provided herein for redirecting video data from a host computer to a remote client using a service processor. The service processor exposes a virtual display adapter to the host computer so that the host computer can send video data to the service processor. The service processor includes a processor, a random access memory, and a device endpoint configured to communicate with the host computer. The service processor also includes a non-volatile memory that stores a firmware that executes on the processor to expose a virtual display adapter to the host computer by way of the device endpoint. Upon exposing the virtual display adapter to the host computer, the service processor receives video data directed to the virtual display adapter from the host computer and sends the video data to a remote client.

20 Claims, 9 Drawing Sheets

REDIRECTING VIDEO TO A REMOTE CLIENT USING A SERVICE PROCESSOR

BACKGROUND

Some server computers utilize a service processor to redirect the video output of the server computer to a remote client. The service processor typically receives video data from a physical display adapter and then sends the received video data to the remote client.

In situations where the server computer does not have a physical display adapter, it may not be possible to redirect video output from the server. Therefore, at present, computers that do not have a physical display adapter are unable to support out-of-band video redirection. Including a physical display adapter in a server computer can be costly and, in some cases, may not be possible given the size of the server computer.

It is with respect to these and other considerations that the disclosure presented herein has been made.

SUMMARY

Technologies are provided herein for redirecting video data from a host computer to a remote client using a service processor. In particular, through the use of the technologies provided herein, a virtual display adapter exposed by a service processor to a host computer may be utilized to redirect video data from the host computer to a remote client.

According to one aspect presented herein, a service processor (also referred to herein as a "baseboard management controller" or "BMC") is provided for use within a host computer system. While service processors have been previously limited to providing functionality for emergency management and remote connectivity, the advanced service processor described herein exposes a virtual display adapter to a host computer such that video data may be redirected to a remote client in communication with the service processor.

In one aspect presented herein, the service processor includes a processor, a random access memory ("RAM") memory, and a device endpoint configured to communicate with the host computer, such as a Universal Serial Bus ("USB") device endpoint. The service processor also includes a non-volatile memory that stores a firmware that executes on the processor to expose a virtual display adapter to the host computer by way of the device endpoint. Upon exposing the virtual display adapter to the host computer, the service processor receives video data directed to the virtual display adapter from the host computer and sends the video data to a remote client.

It should be appreciated that the above-described subject matter may also be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The following detailed description is directed to technologies for redirecting video data from a host computer to a remote client using a service processor. According to embodiments, a service processor is provided that exposes a virtual display adapter to a host computer, such that the host computer can send video data to the service processor. The video data is then sent to a remote client that is in communication with the service processor.

In the following detailed description, references are made to the accompanying drawings that form a part hereof, and which are shown by way of exemplary embodiments and implementations. Note that although the subject matter presented herein has been described in conjunction with one or more particular embodiments and implementations, it is to be understood that the embodiments are not necessarily limited to the specific structure, configuration, or functionality described herein. Rather, the specific structure, configuration, and functionality described herein are disclosed as examples. Various modifications and changes may be made to the subject matter described herein without following the exemplary embodiments and applications illustrated and described, and without departing from the true spirit and scope of the embodiments.

Figure 1:
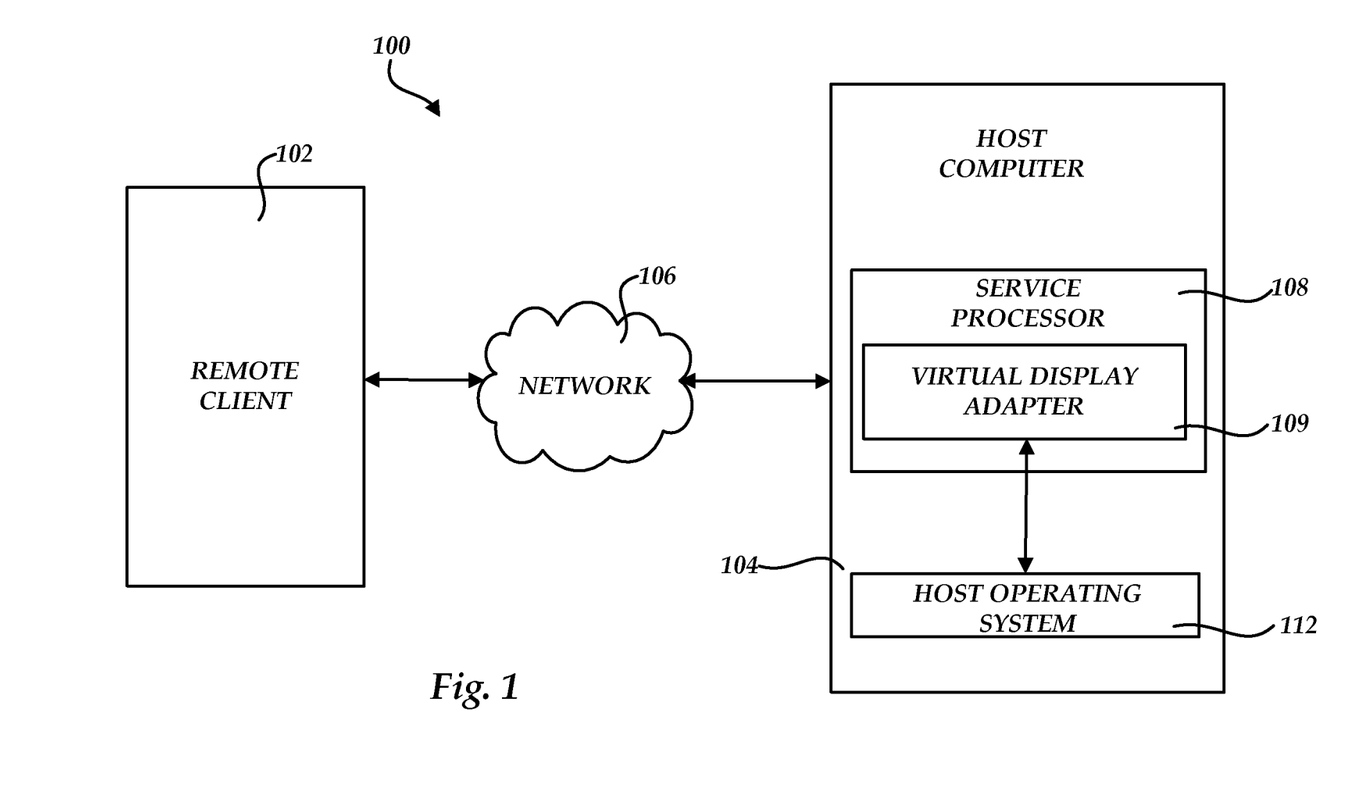
FIG. 1 is a network and computer architecture diagram showing aspects of a host computer including a service processor and a remote client provided in one embodiment presented herein.

FIG. 1 is a network and computer architecture diagram showing a system 100 provided herein that includes a remote client 102 and a host computer 104 communicatively coupled via a network 106. The network 106 may be a local area network ("LAN"), a wide area network ("WAN") such as the Internet, or other type of network. The host computer 104 comprises a network-enabled server computer equipped with a service processor 108.

The service processor 108 is configured to monitor and control aspects of the operation of the host computer 104. As described in greater detail below, the service processor 108 provided herein is also configured to expose a virtual display adapter 109 to a host operating system 112 of the host computer 104. The virtual display adapter 109 is not a physical display adapter. Rather, the virtual display adapter is a software emulation of a display adapter provided by the service processor 108. From the perspective of the operating system 112, the virtual display adapter 109 appears to be a physical device. Accordingly, the host operating system 112 may send video data to the virtual display adapter 109 in the same way it would a physical display adapter. In turn, the service processor 108 may send the video data received from the host computer 104 to the remote client 102. In this way, video data at the host computer 104 may be redirected to the remote client 102 via the service processor 108 without the use of a physical video hardware device present on the host computer or the service processor 108.

Video data may be data that is associated with displaying information at a video display. Video data includes, but is not limited to data representing a screen image, including the resolution, color, contrast, and other visual properties that are descriptive of a screen image. Further, video data may represent entire screen images, or only changes in a current screen image when compared to a previous screen image. In various embodiments, changes in video data are communicated between the service processor 108 and the remote client 102 in order to reduce the amount of video data being sent over the network 106. This improves the speed at which screen images may be refreshed as well as the resolution. In addition, video data may include display parameters and configuration information, such as the resolution, color bit information and other information related to a video display.

Figure 2:
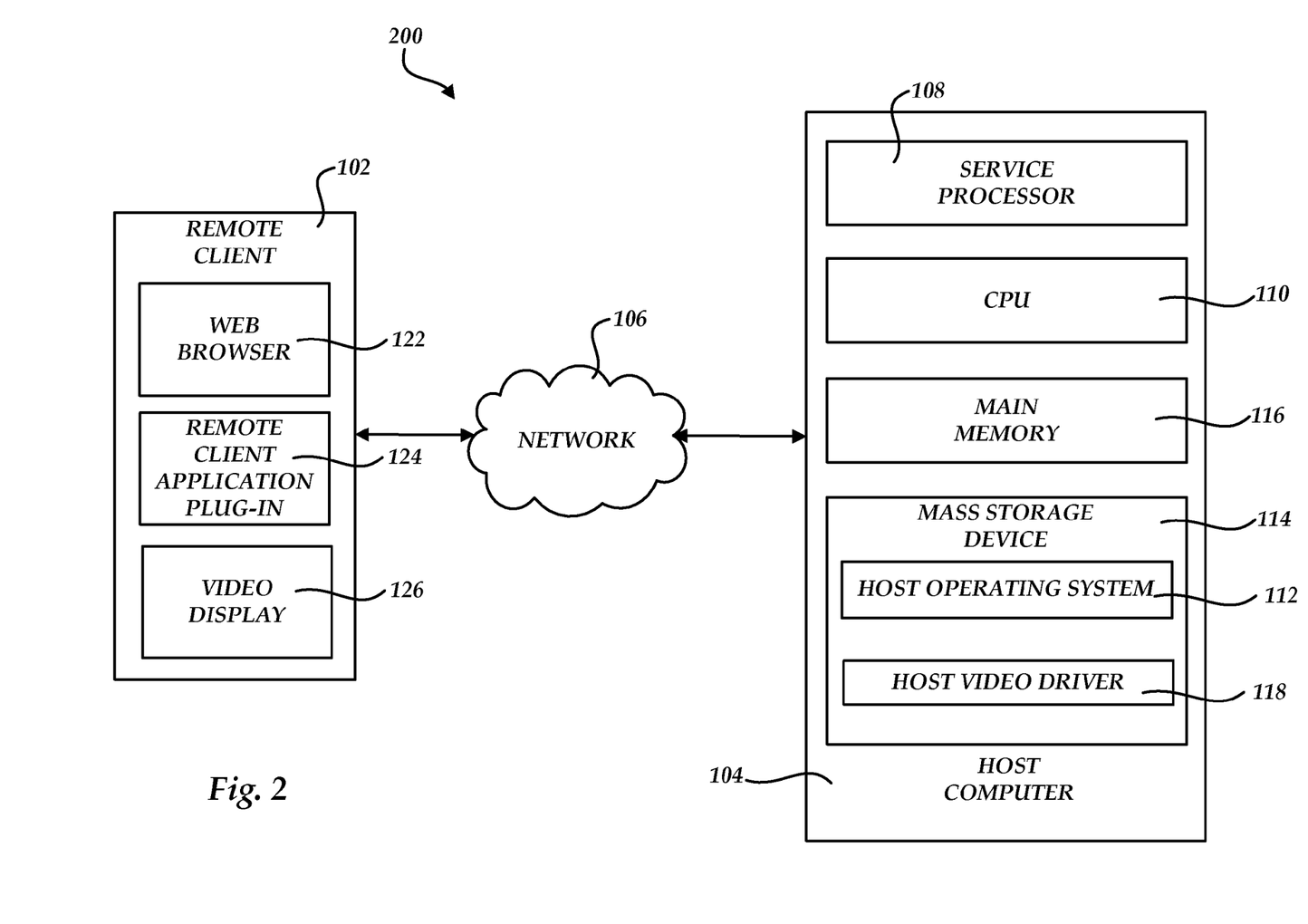
FIG. 2 is a network and computer architecture diagram showing further aspects of the host computer and the remote client provided in one embodiment presented herein.

FIG. 2 is a network and computer architecture diagram showing aspects of a system 200 that includes the host computer 104 and the remote client 102 provided in one embodiment presented herein. Referring now to FIG. 2, aspects of the host computer 104 and the remote client 102 will be described. In particular, the host computer 104 includes a number of conventional computing components such as a central processing unit ("CPU") 110, a main memory 116 and a mass storage device 114, such as a hard disk device, that stores the host operating system 112. The host operating system 112 is executed by the host computer 104 in a conventional fashion. For instance, according to embodiments presented herein, the host operating system 112 may comprise the LINUX operating system, the WINDOWS SERVER operating system from MICROSOFT CORPORATION, or another type of operating system suitable for controlling the operation of a server computer. The mass storage device 114 may also include a host video driver 118 that enables the host operating system 112 to utilize the virtual display adapter 109 as the video output device. Additional details regarding the architecture and operation of the service processor 108 are provided below with respect to FIGS. 3-8.

FIG. 2 also illustrates additional aspects of the remote client 102. In particular, the remote client 102 is a computer system capable of executing a web browser 122 in one embodiment. In this regard, the remote client 102 may include a remote client application plug-in 124 that is configured to execute in conjunction with the web browser 122 to allow the remote client 102 to communicate with the service processor 108. As will be described in greater detail below, the service processor 108 provides a web interface accessible using the web browser 122. The web interface may allow a user of the remote client 102 to configure aspects of the service processor 108 and the host computer 104. The web interface may also allow the remote client application plug-in 124 to be downloaded to the remote client 102.

As shown in FIG. 2, the remote client 102 also includes a video display 126 that can be utilized to display the video data received from the service processor 108. Details pertaining to the video data and how it is communicated from the host computer 104 to the remote client 102 are also provided below with respect to FIGS. 3-8.

Figure 3:
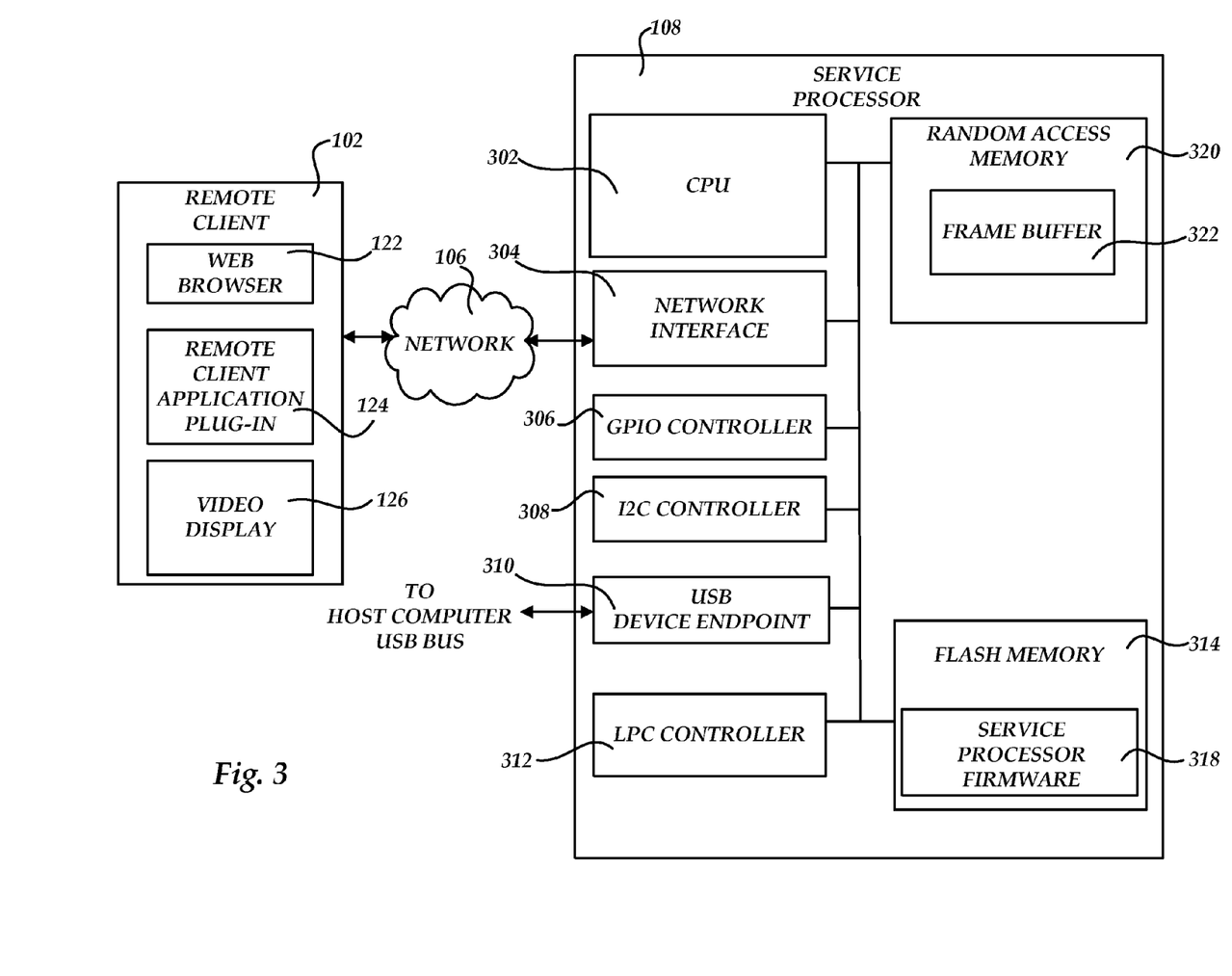
FIG. 3 is a network and computer architecture diagram showing aspects of a service processor provided in one embodiment presented herein.

FIG. 3 is a network and computer architecture diagram showing aspects of a service processor provided in one embodiment presented herein. In particular, in one embodiment, the service processor 108 may reside within the host computer 104 as a system on chip or alternatively, as a processor card that is connected to the host computer 104.

The service processor 108 includes a CPU 302 and a network interface 304. The network interface 304 is utilized to establish a connection to the remote client 102 via the network 106. In addition, the service processor 108 may also include a general purpose input/output ("GPIO") controller 306, an I$^2$C controller 308 that may be configured to provide one or more buses, and a low pin count ("LPC") controller 312.

The service processor 108 also includes a device endpoint configured to communicate with the host computer 104. In particular, in one implementation the device endpoint comprises a USB device endpoint 310 connected to a USB bus of the host computer 104, thereby creating a USB connection between the host computer 104 and the service processor 108. The USB connection may be utilized to send and receive data, including video data to the USB device endpoint 310. It should be appreciated that while a USB connection is described herein for enabling a communication between the host computer 104 and the service processor 108, other types of hardware interfaces may also be used to enable communication between the host computer 104 and the service processor 108.

As shown in FIG. 3, the service processor 108 also includes a RAM 320 that may be used to store a frame buffer 322. The frame buffer 322 may be used to store video data received from the host computer 104. The service processor 108 also includes a non-volatile memory, such as a flash memory 314. In one implementation, the flash memory 314 stores a service processor firmware 318 that executes on the CPU 302 and controls the operation of the service processor 108. The service processor firmware 318 may be configured to expose a virtual display adapter, such as the virtual display adapter 109 to the host computer 104.

Upon exposing the virtual display adapter 109 to the host computer 104, the service processor firmware 318 may receive video data directed to the virtual display adapter 109 from the host computer 104, store the video data in the frame buffer 322, establish connections with remote clients, such as the remote client 102, and send the video data to the remote client 102. Additional details regarding the operation of the service processor firmware 318 are provided below with respect to FIG. 4. It should be appreciated that, in alternate embodiments, one or both of the flash memory 314 and the random access memory 320 may reside outside the service processor 108.

Figure 4:
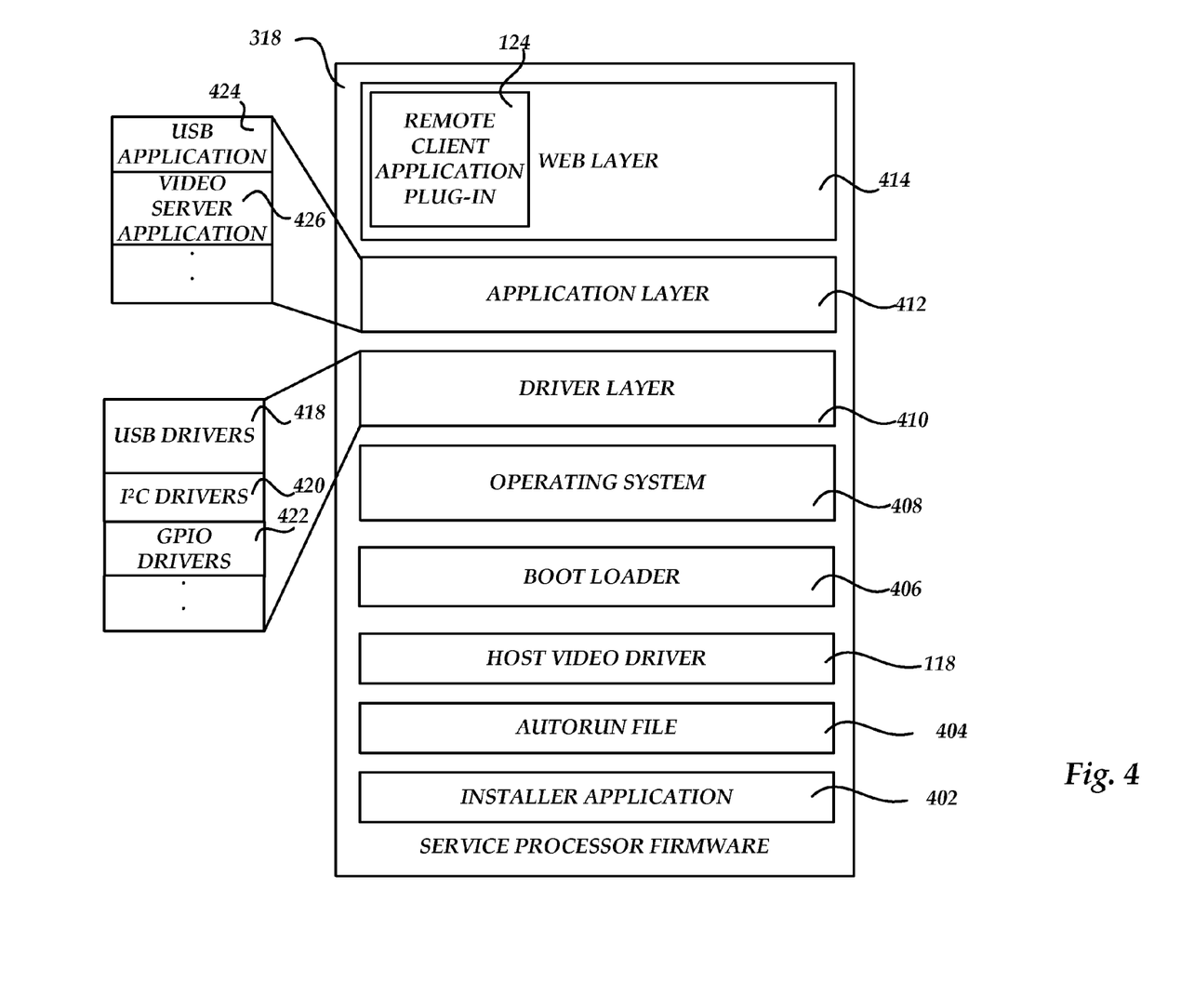
FIG. 4 is a firmware diagram showing aspects of a service processor firmware provided in one embodiment presented herein.

FIG. 4 is a firmware diagram showing aspects of a service processor firmware provided in one embodiment presented herein. Referring to FIG. 4, additional details regarding the configuration of the service processor firmware 318 will be provided. In particular, the service processor firmware 318 includes a host video driver 118, an installer application 402, and an autorun file 404. The installer application 402 and the autorun file 404 may be configured to install the host video driver 118 on the host computer 104. According to embodiments, the service processor 108 may expose a portion of the mass storage device to the host computer 104 that has the host video driver 118, the autorun file 404 and the installer application 402 stored thereon. Once the portion of the mass storage device is exposed to the host computer 104, the autorun file 404 causes the installer application 402 to be executed on the host computer 104 which, in turn, installs the host video driver 118.

As will be described below in regard to FIGS. 5-8, the host video driver 118 is a driver that is compatible with the host operating system 112. Once the host video driver 118 has been installed on the host computer 104, the host operating system 112 can use the virtual display adapter 109 just as it would utilize a physical video adapter connected thereto. In this regard, the host operating system 112 can send video data to the service processor 108 by way of the host video driver 118.

The service processor 108 also includes a boot loader 406 and an operating system 408 that is configured to perform various functionalities of the service processor 108. According to implementations, the service processor firmware 318 also includes a driver layer 218, which includes various drivers, such as USB drivers 418, I²C drivers 420 and GPIO drivers 422. The I²C drivers 420 and the GPIO drivers 422 may be configured to support the I²C controller 308 and the GPIO controller 306 of the service processor 108, respectively.

The USB drivers 418 may be configured to control the USB device endpoint 310, which may be utilized to expose various devices to the host computer 104. As will be described in further detail below in regard to FIGS. 5-8, the USB drivers 418 may be configured to implement the core functionality of the USB device endpoint 310 of the service processor 108. The USB drivers 418 may include a descriptor for the virtual display adapter 109. The descriptor for the virtual display adapter 109 includes display parameters and configuration information such as resolution information, color bit information, and other relevant display information. In this way, when a remote client, such as the remote client 102 establishes a connection with the service processor 108, the service processor 108 can send the descriptor for the virtual display adapter 109 to the remote client 102 so that the remote client 102 may be able to draw a screen image on the video display 126 according to the information provided by the descriptors for the virtual display adapter 109.

The service processor 108 further includes an application layer 412 configured to communicate with the driver layer 410. The application layer 412 may include at least a USB application 424 and a video server application 426. The USB application 424 may be configured to communicate with the USB drivers 418 to expose various devices to the host computer 104 via the USB device endpoint 310. In particular, the USB drivers 418 and the USB application 424 may be configured to expose a portion of the flash memory 314 as a mass storage device to the host computer 104 in order to install the host video driver 118 on the host computer 104.

According to embodiments, the USB application 424 may expose a mass storage device to the host computer 104 that has the host video driver 118, the autorun file 404 and the installer application 402 stored thereon. As discussed above, the autorun file 404 causes the installer application 402 to be executed on the host computer 104 which, in turn, installs the host video driver 118. After the host video driver 118 is installed and initialized on the host computer 104, the USB drivers 418 and the USB application 424 of the service processor 108 may expose the virtual display adapter 109 to the host computer 104. The host computer 104 may detect that the virtual display adapter 109 is connected to the host computer 104, and may be configured to send video data to the service processor 108 via the virtual display adapter 109.

Once the video data sent by the host computer 104 is received by the service processor 108 via the USB device endpoint 310, the USB drivers 418 and USB application 424 store the video data in the frame buffer 322. As new video data is received by the service processor 108, the new video data overwrites older data stored in the frame buffer 322.

The video server application 426 of the service processor firmware 318 may also be configured to send the video data stored in the frame buffer 322 to the remote client 102 once the remote client 102 has established a connection with the service processor 108. The video server application 426 may be configured to read the video data from the frame buffer, send it to a compression engine (not shown) that is configured to compress the video data, and then forward the compressed video data to the remote client. It should be appreciated however, that the video server application may read and send the video data without compressing the video data before sending the video data to the remote client 102. In this way, once a remote client, such as the remote client 102 is connected, the video server application 426 may be configured to send the latest video data to the remote client 102 without having to wait for the USB application 424 to receive and store the latest video data in the frame buffer 322.

The service processor firmware 318 may also include a web layer 414 that is configured to provide a web interface to the remote client 102. According to embodiments, the web layer 414 may provide functionality for providing the remote client application plug-in 124 to the remote client 102 if it is not already installed thereon. The web layer might also provide web-based functionality for configuring aspects of the operation of the service processor 108 or the host computer 104.

As discussed above, the remote client application plug-in 124 may be configured to install and execute on the remote client 102. The remote client application plug-in 124 receives the video data from the service processor 108 and displays the video data on the video display 126 at the remote client 102. Other modules at the remote client 102 may be responsible for communicating with the host computer 104. It should be appreciated that the service processor firmware 318, the host computer 104, and the remote client 102 may also include additional drivers, libraries, applications, and associated application plug-ins that may be configured to make video redirection functionality described herein programmable and scriptable for ease of use.

Figure 5:
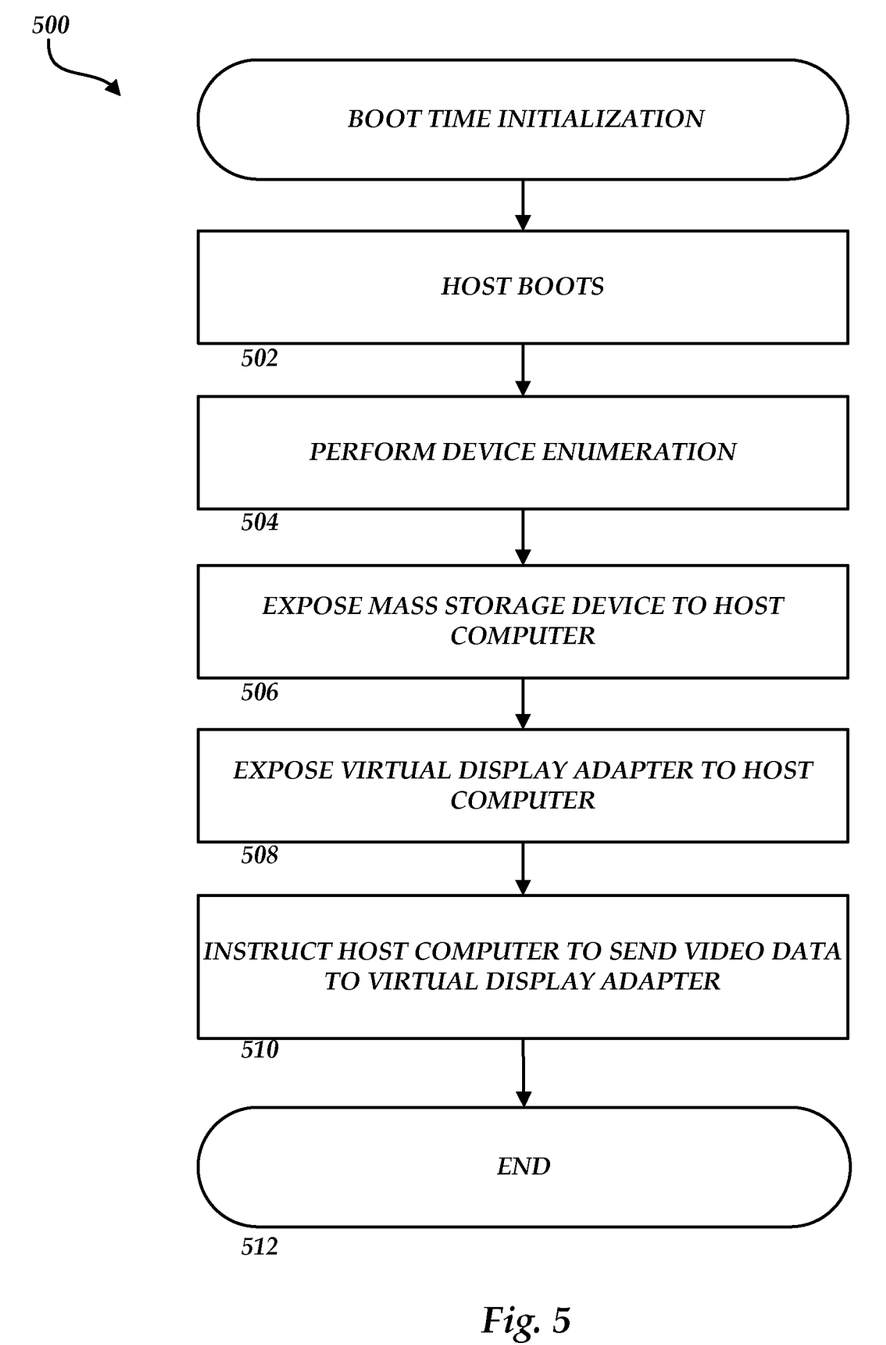
FIG. 5 is a flow diagram showing aspects of the operation of a host computer provided in one embodiment presented herein.

FIG. 5 is a flow diagram showing operations performed by the host computer 104 and the service processor 108 in one embodiment presented herein. In particular, FIG. 5 is a flow diagram illustrating a routine 500 for exposing a virtual display adapter 109 to the host computer 104, as provided in one embodiment presented herein. It should be appreciated that the logical operations described herein with respect to the various figures are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

The routine 500 begins at operation 502, where the host computer 104 is booted. Once the host computer 104 is booted and/or a firmware of the host computer 104 gets control at operation 502, the routine 500 proceeds to operation 504, where the host computer 104 performs device enumeration. During device enumeration, the host computer 104 may discover and initialize all the devices attached to the host computer 104. This may include initializing drivers associated with the devices attached to the host computer 104. According to embodiments, the USB device endpoint 310 of the service processor 108 is connected to the USB bus of the host computer 104, such that during device enumeration, the host computer discovers and initializes the video display adapter 109 and the mass storage device by the service processor 108 as USB devices.

Once device enumeration is performed at operation 504, the routine 500 proceeds to operation 506, where the service processor 108 exposes a virtual mass storage device to the host computer 104. As described above, the USB drivers 418 and USB application 424 of the service processor 108 may be configured to expose the mass storage device to the host computer 108. Upon exposing the mass storage device to the host computer 104, the installer application 402 and the autorun file 404 associated with the host video driver 118 of the service processor firmware 318 are executed on the host computer 104, thereby installing the host video driver 118 for the virtual display adapter 109 on the host computer 104. According to embodiments, a program stored on the mass storage device exposed to the host computer 104 may be configured to determine whether the video driver 109 is already installed on the host computer 104 and further configured to utilize the USB drivers 418 and USB application 424 to install the video driver 109 on the host computer using the installer application 402 and the autorun file 404 if the host video driver 118 is not already installed on the host computer 104.

From operation 506, the routine 500 proceeds to operation 508, where the service processor 108 exposes the virtual display adapter 109 to the host computer 104. Once the virtual display adapter 109 is exposed to the host computer 104, the host video driver 118 is executed and the host operating system 112 may be notified that a display adapter is available for displaying video data. It should be appreciated that the host computer 104 may not be able to determine whether the virtual display adapter 109 exposed to the host computer 104 is a virtual display adapter and not a physical video hardware device. In this way, the host computer interacts with the virtual display adapter 109 in a similar manner as it would with a physical video hardware device.

From operation 508, the routine proceeds to operation 510, where the host computer is instructed to send video data to the virtual display adapter 109. According to embodiments, applications running on the host operating system 112 of the host computer 104 may be configured to send the video data to the virtual display adapter in order to redirect video from the host computer to a remote client. In this way, the host computer may utilize the virtual display adapter 109 to display video data at the remote client 109 as either a primary display or desktop, an extended desktop, or a mirrored desktop. From operation 510, the routine 500 ends at operation 512.

Figure 6:
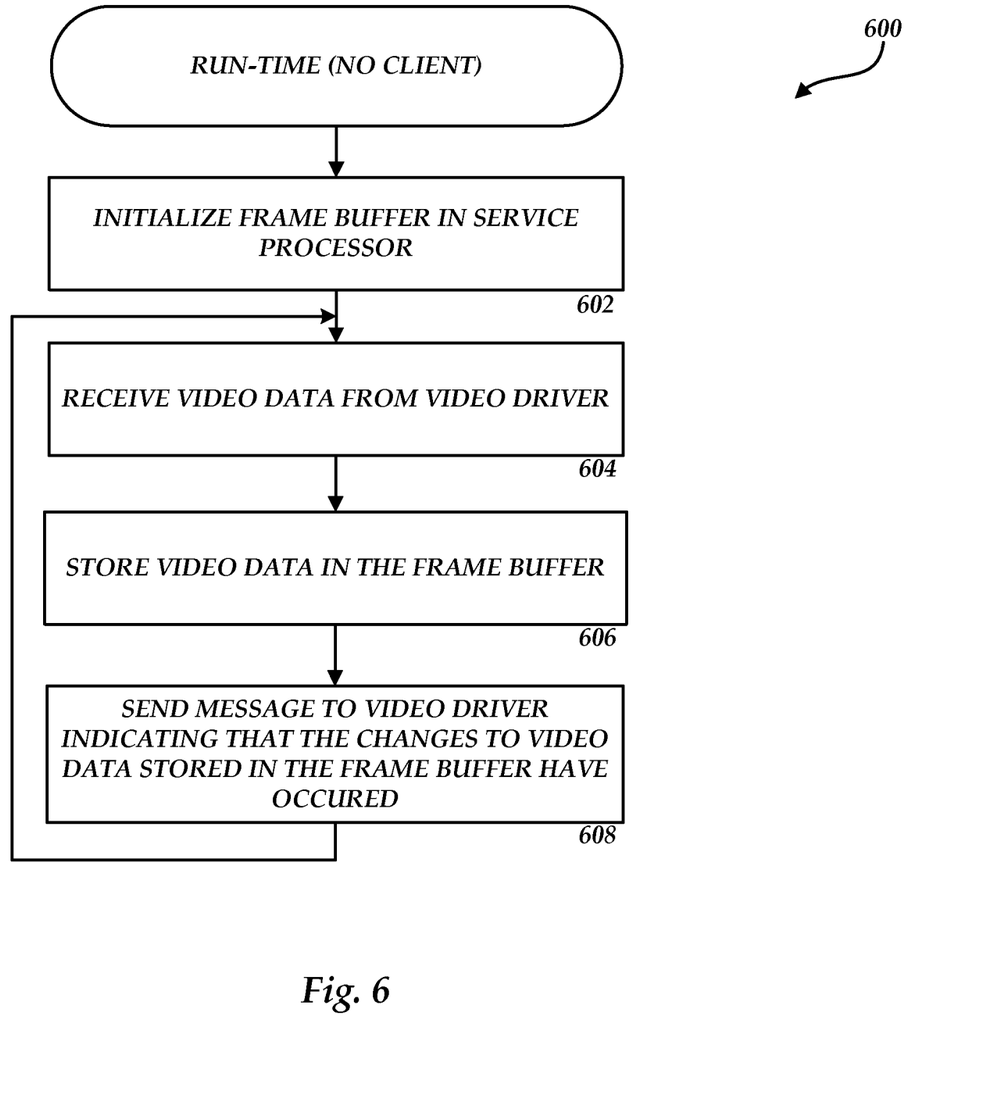
FIG. 6 is a flow diagram showing aspects of the operation of a service processor when no remote client is connected provided in one embodiment presented herein.

FIG. 6 is a flow diagram showing aspects of the operation of a service processor when no remote client is connected provided in one embodiment presented herein. In particular, FIG. 6 shows a routine 600 for receiving video data from the host computer 104 and storing the video data in a frame buffer 322 of the service processor 108.

The routine 600 begins at operation 602, where the frame buffer 322 of the service processor 108 is initialized. The initialization process includes receiving video data, which may include descriptors for the virtual display adapter 109 that include display parameters and configuration information, such as the screen image size, color bit, and the like. From operation 602, the routine 600 continues to operation 604, where the service processor 108 receives the video data from the host video driver 118. In various embodiments, the host computer 104 only sends changes in the video data by comparing a current screen image with a previous screen image. In addition, the video data may include instructions notifying the virtual display adapter 109 of any changes to the configuration information, such as changing the resolution of the virtual display adapter.

Upon receiving the video data from the host computer 104 at operation 604, the routine 600 proceeds to operation 606, where the video data is stored in the frame buffer 322. The video data stored in the frame buffer 322 may be continuously updated with new video data being received from the host computer 104 so that when a remote client, such as the remote client 102 connects to the service processor 108, the latest video data stored in the frame buffer 322 is sent to the remote client 102 and displayed on the display 126 screen at the remote client 102.

From operation 606, the routine 600 proceeds to operation 608, where the service processor 108 sends back an acknowledgement to the host computer 104 indicating that the video data has been received and any changes to the configuration information have been processed. According to embodiments, the host video driver 118 of the host computer 104 may communicate with the USB drivers 418 and the USB application 424 by way of the USB device endpoint 310. From operation 608, the routine 600 continues to operation 604, where operations 604, 606 and 608 are repeated as long as the virtual display adapter 109 is being exposed to the host computer 104 and video data is being sent to the virtual display adapter 109.

Figure 7:
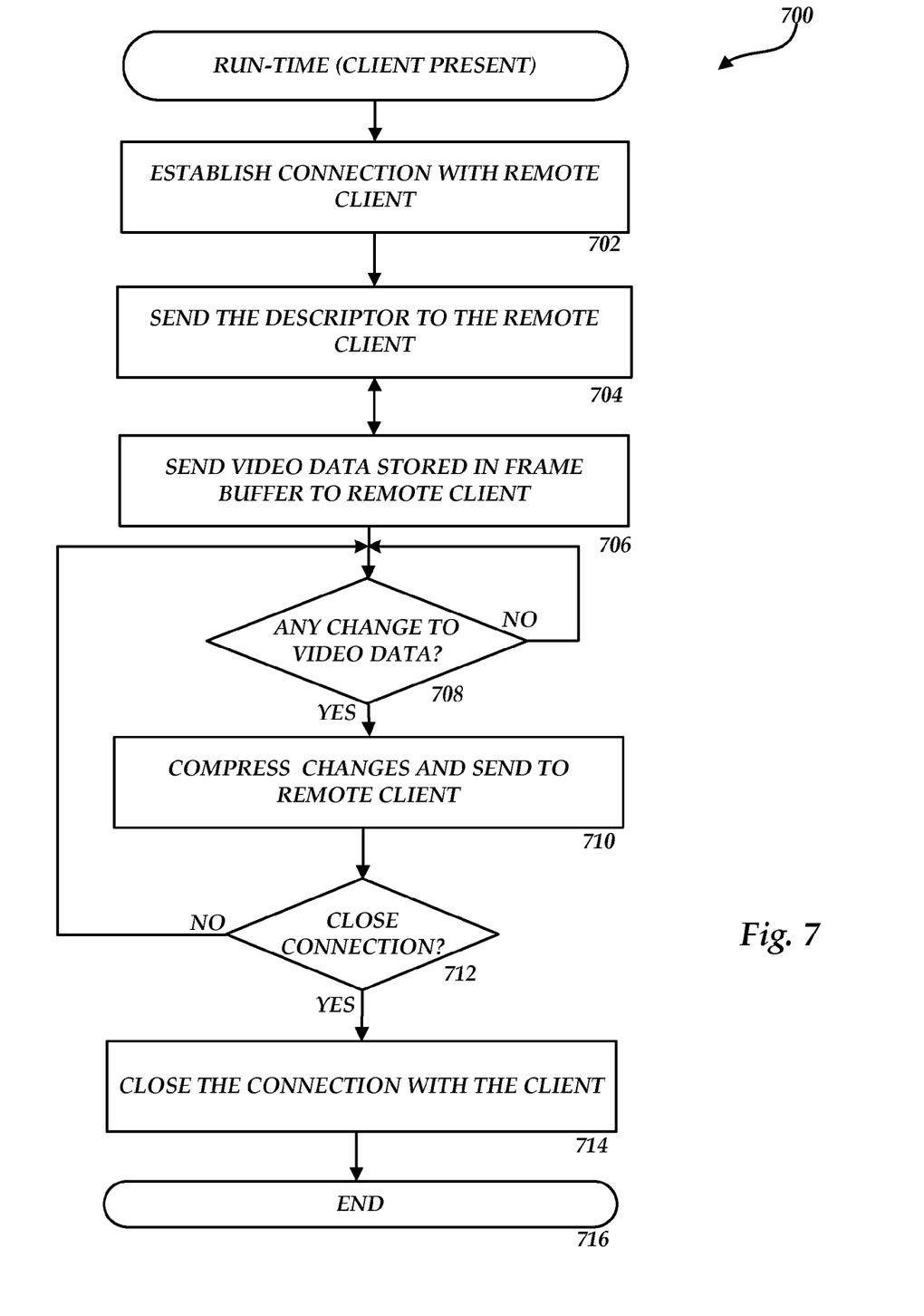
FIG. 7 is a flow diagram showing aspects of the operation of a service processor when a remote client is connected in one embodiment presented herein.

FIG. 7 is a flow diagram showing aspects of the operation of a service processor when a remote client is connected in one embodiment presented herein. The routine 700 begins as operation 702, where the service processor 108 establishes a connection with the remote client 102. The service processor 108 may establish a connection with the remote client 102 over the network 106 via the network interface 304 of the service processor 108. In this way, information is being sent to and received from the remote client 102 via the network interface of the service processor 108. From operation 702, the routine 700 proceeds to operation 704, where the service processor 108 sends a descriptor for the virtual display adapter 109 to the remote client 102. As will be described in FIG. 8, the remote client 102 utilizes the descriptor for the virtual display adapter 109 to set up a screen image on the video display 126 at the remote client 102. From operation 704, the routine 700 continues to operation 706, where the video data stored in the frame buffer 322 is sent to the remote client 102.

From operation 706, the routine 700 proceeds to operation 708, where the service processor 108 determines whether the contents of the frame buffer 322 have changed since the last time video data was sent to the remote client 102. If not, the routine 700 returns to operation 708. If so, the routine 700 proceeds to operation 710, where the new video data is sent to the remote client 102. As mentioned earlier, the video data may be compressed by the service processor 108 prior to sending the video data to the remote client 102.

From operation 710, the routine 700 proceeds to operation 712, where the service processor determines whether the connection between the service processor 108 and the remote client 102 should be closed. If the connection is not to be closed, the routine 700 repeats operations 708, 710 and 712 until a request to close the connection is received. Upon determining that the connection is to be closed at operation 712, the routine 700 continues to operation 714, where the connection is closed. The routine 700 then proceeds to operation 716, where it ends.

Figure 8:
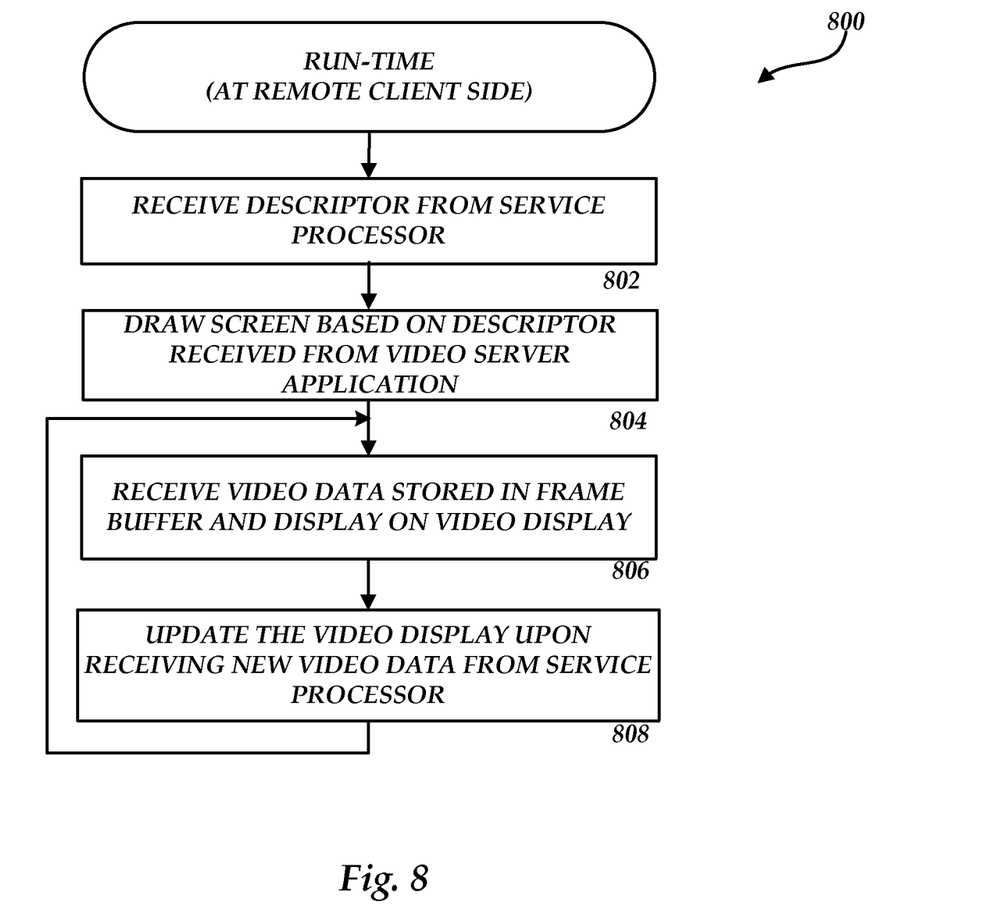
FIG. 8 is a flow diagram showing aspects of the operation of a remote client configured to receive video data from a service processor in one embodiment presented herein.

FIG. 8 is a flow diagram showing aspects of the operation of a remote client configured to receive video data from a service processor in one embodiment presented herein. The routine 800 begins at operation 802, where the remote client 102 receives the descriptor for the virtual display adapter 109 from the service processor 108 so that the remote client may set up a screen image on the video display 126 at the remote client 102. From operation 802, the routine 800 proceeds to operation 804, where the remote client 102 draws the screen image on the screen display 126 based on the descriptor received from the service processor 108. It should be appreciated that the video server application 426 of the service processor firmware 318 may be configured to send the descriptor from the service processor 108 to the remote client 102 once a connection is established between the remote client 102 and the service processor 108.

From operation 804, the routine continues to operation 806, where the video data that is sent by the service processor 108 is received by the remote client 102 and displayed on the video display 126. From operation 806, the routine proceeds to operation 808, where the video display 126 at the remote client 102 is updated upon receiving new video data from the service processor 108. From operation 808, the routine 800 repeats operation 806 and 808, so that the remote client 102 may receive new video data from the service processor 108 and update the screen image on the video display 126 at the remote client 102.

Figure 9:
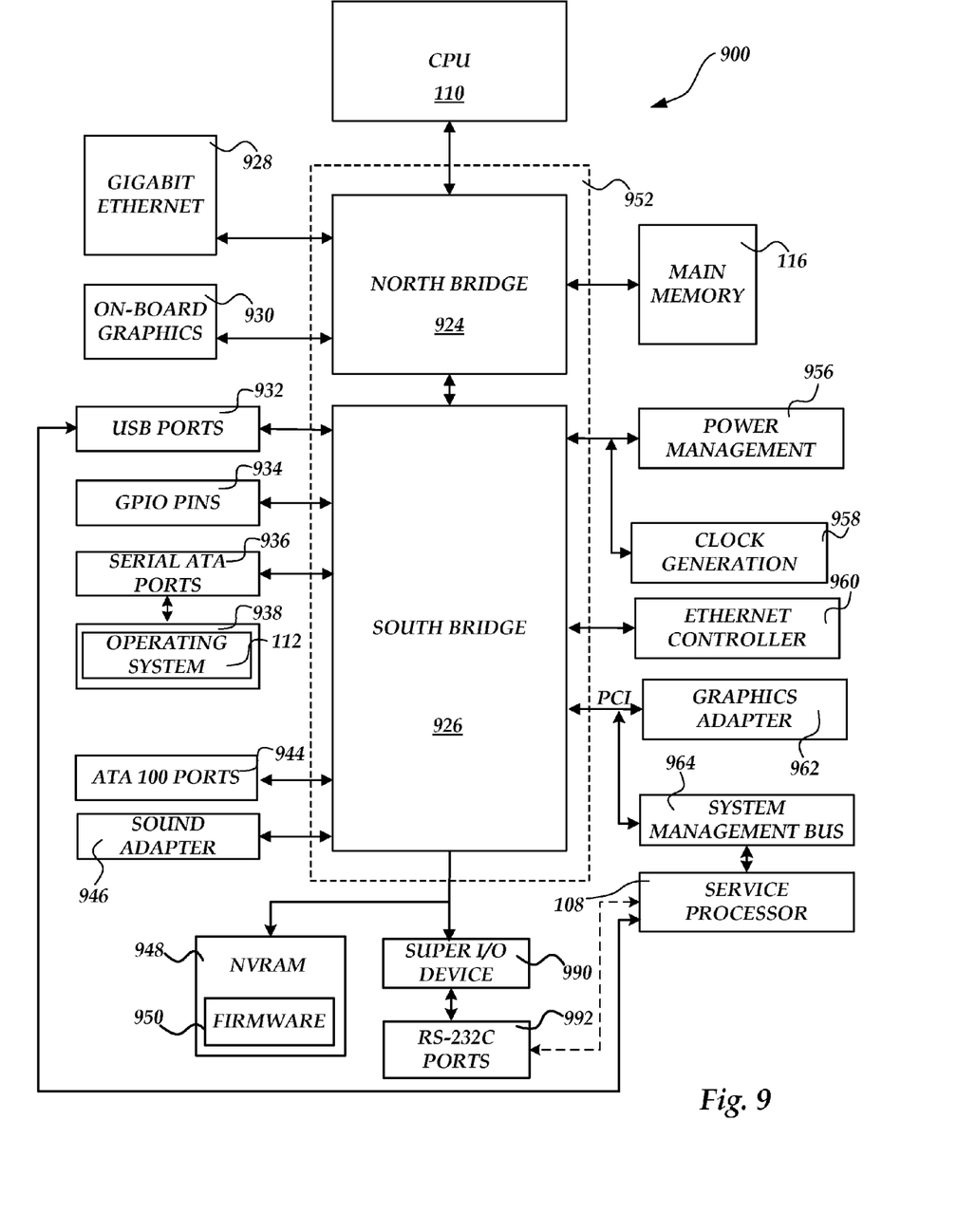
FIG. 9 is a computer architecture diagram showing an illustrative computer architecture for implementing the various computing systems presented herein.

FIG. 9 and the following discussion are intended to provide a brief, general description of a suitable computing environment in which the embodiments described herein may be implemented. While the technical details are presented herein in the general context of program modules that execute in conjunction with the execution of an operating system, those skilled in the art will recognize that the embodiments may also be implemented in combination with other program modules.

Generally, program modules include routines, programs, components, data structures, and other types of structures that perform particular tasks or implement particular abstract data types. Moreover, those skilled in the art will appreciate that the embodiments described herein may be practiced with other computer system configurations, including hand-held devices, multiprocessor systems, microprocessor-based or programmable consumer electronics, minicomputers, mainframe computers, and the like. The embodiments described herein may also be practiced in distributed computing environments where tasks are performed by remote processing devices that are linked through a communications network. In a distributed computing environment, program modules may be located in both local and remote memory storage devices.

FIG. 9 shows a computer architecture for an illustrative computer 900 that may be utilized to embody the hardware and software components presented herein for the host computer 104. Some or all of the architecture shown in FIG. 9 may also be utilized to implement the remote client 102. As discussed above, other types of computers and computing devices may also be utilized to implement the embodiments presented herein.

The computer 900 includes a baseboard, or "motherboard", which is a printed circuit board to which a multitude of components or devices may be connected by way of a system bus or other electrical communication path. In one illustrative embodiment, a CPU 110 operates in conjunction with a chipset 952. The CPU 110 is a standard central processor that performs arithmetic and logical operations necessary for the operation of the computer. The computer 900 may include a multitude of CPUs 110.

The chipset 952 includes a north bridge 924 and a south bridge 926. The north bridge 924 provides an interface between the CPU 110 and the remainder of the computer 900. The north bridge 924 also provides an interface to a random access memory ("RAM") used as the main memory 116 in the computer 900 and, possibly, to an on-board graphics adapter 930. The north bridge 924 may also include functionality for providing networking functionality through a gigabit Ethernet adapter 928. The gigabit Ethernet adapter 928 is capable of connecting the computer 900 to another computer via a network. Connections that may be made by the network adapter 928 may include LAN or WAN connections. LAN and WAN networking environments are commonplace in offices, enterprise-wide computer networks, intranets, and the Internet. The north bridge 924 is connected to the south bridge 926.

The south bridge 926 is responsible for controlling many of the input/output functions of the computer 900. In particular, the south bridge 926 may provide one or more universal serial bus ("USB") ports 932, a sound adapter 946, an Ethernet controller 960, and one or more general-purpose input/output ("GPIO") pins 934. The south bridge 926 may also provide a bus for interfacing peripheral card devices such as a graphics adapter 962. In one embodiment, the bus comprises a peripheral component interconnect ("PCI") bus. The south bridge 926 may also provide a system management bus 964 for use in managing the various components of the computer 900. Additional details regarding the operation of the system management bus 964 and its connected components are provided below.

The south bridge 926 is also operative to provide one or more interfaces for connecting mass storage devices to the computer 900. For instance, according to an embodiment, the south bridge 926 includes a serial advanced technology attachment ("SATA") adapter for providing one or more SATA ports 936 and an ATA 100 adapter for providing one or more ATA 100 ports 944. The SATA ports 936 and the ATA 100 ports 944 may be, in turn, connected to one or more mass storage devices such as the SATA disk drive 938 storing an operating system 112 and application programs. As known to those skilled in the art, the operating system 112 comprises a set of programs that control operations of a computer and allocation of resources. An application program is software that runs on top of the operating system software, or other runtime environment, and uses computer resources to perform application specific tasks desired by the user. According to one embodiment of the invention, the operating system 112 comprises the LINUX operating system. According to another embodiment of the invention, the operating system 112 comprises the WINDOWS SERVER operating system from MICROSOFT CORPORATION. According to another embodiment, the operating system 112 comprises the UNIX or SOLARIS operating system. It should be appreciated that other operating systems may also be utilized.

The mass storage devices connected to the south bridge 926, and their associated computer-readable media, provide non-volatile storage for the computer 900. Although the description of computer-readable media contained herein refers to a mass storage device, such as a hard disk or CD-ROM drive, it should be appreciated by those skilled in the art that computer-readable media can be any available media that can be accessed by the computer 900. By way of example, and not limitation, computer-readable media may comprise computer-readable storage media and communication media. Computer-readable storage media includes volatile and non-volatile, removable and non-removable media implemented in any method or technology for storage of information such as computer-readable instructions, data structures, program modules or other data. Computer-readable storage media includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information.

A low pin count ("LPC") interface may also be provided by the south bridge 926 for connecting a "Super I/O" device 970. The Super I/O device 970 is responsible for providing a number of input/output ports, including a keyboard port, a mouse port, a serial interface 992, a parallel port, and other types of input/output ports. The LPC interface may also connect a computer storage media such as a ROM or a flash memory such as a NVRAM 948 for storing the firmware 950 that includes program code containing the basic routines that help to start up the computer 900 and to transfer information between elements within the computer 900.

As described briefly above, the south bridge 926 may include the system management bus 964. The system management bus 964 may be connected to the service processor 108. As discussed above, the service processor 108 includes functionality for providing a virtual display adapter 109 to the host computer 104 via the USB device endpoint 310. In this regard, the service processor 108 includes an interface to the USB ports 932 provided by the computer 900.

It should be appreciated that the computer 900 may comprise other types of computing devices, including hand-held computers, embedded computer systems, personal digital assistants, and other types of computing devices known to those skilled in the art. It is also contemplated that the computer 900 may not include all of the components shown in FIG. 9, may include other components that are not explicitly shown in FIG. 9, or may utilize an architecture completely different than that shown in FIG. 9.

It should be appreciated that the software components described herein may, when loaded into the CPU 110 and executed, transform the CPU 110 and the overall computer 900 from a general-purpose computing system into a special-purpose computing system customized to facilitate the functionality presented herein. The CPU 110 may be constructed from any number of transistors or other discrete circuit elements, which may individually or collectively assume any number of states. More specifically, the CPU 110 may operate as a finite-state machine, in response to executable instructions contained within the software modules disclosed herein. These computer-executable instructions may transform the CPU 110 by specifying how the CPU 110 transitions between states, thereby transforming the transistors or other discrete hardware elements constituting the CPU 110.

Encoding the software modules presented herein may also transform the physical structure of the computer-readable media presented herein. The specific transformation of physical structure may depend on various factors, in different implementations of this description. Examples of such factors may include, but are not limited to: the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software may also transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer 900 in order to store and execute the software components presented herein. It also should be appreciated that the computer 900 may comprise other types of computing devices, including hand-held computers, embedded computer systems, personal digital assistants, and other types of computing devices known to those skilled in the art. It is also contemplated that the computer 900 may not include all of the components shown in FIG. 9, may include other components that are not explicitly shown in FIG. 9, or may utilize an architecture completely different than that shown in FIG. 9.

Based on the foregoing, it should be appreciated that technologies for redirecting video data from a host computer to a remote client using a service processor are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. An apparatus for redirecting video data from a host computer using a service processor, comprising:
   a service processor configured to monitor and control aspects of operations of the host computer, including:
   a processor;
   a random access memory (RAM);
   a USB device endpoint configured to communicate with the host computer; and a non-volatile memory storing a firmware, the firmware comprising computer-executable instructions which, when executed by the processor,
cause the USB device endpoint to expose a virtual display adapter to the host computer such that the host computer detects that a video adapter is connected to the host computer through a USB interface,
cause an application of the firmware to receive, through the USB device endpoint, video data directed to the virtual display adapter from the host computer, and
cause an application of the firmware to send the received video data to a remote client through a network.

2. The apparatus of claim 1, wherein the RAM comprises a frame buffer, and wherein sending the video data to a remote client comprises:
writing the video data received from the host computer to the frame buffer;
establishing a connection with the remote client comprising a video display;
reading the video data from the frame buffer; and
sending the video data read from the frame buffer to the remote client.

3. The apparatus of claim 1, wherein the firmware comprises further computer-executable instructions which, when executed by the processor, cause the apparatus to:
receive a descriptor from the host computer; and
send the descriptor to the remote client prior to sending the video data.

4. The apparatus of claim 3, wherein the descriptor comprises resolution information and color information for the virtual display adapter.

5. The apparatus of claim 1, wherein the firmware comprises further computer-executable instructions which, when executed by the processor, cause the apparatus to compress the video data prior to sending the video data to the remote client.

6. The apparatus of claim 1, further comprising a network interface configured to communicate with the remote client.

7. The apparatus of claim 1, wherein the firmware further comprises a host video driver for the virtual display adapter and an installer application for installing the host video driver on the host computer.

8. The apparatus of claim 1, wherein the device endpoint is configured for communication with a bus of the host computer.

9. The apparatus of claim 1, wherein the firmware further comprises a web layer configured to provide a web interface to the remote client.

10. The apparatus of claim 9, wherein the web layer is further configured to provide a remote client application plug-in to the remote client, the remote client application plug-in configured to execute on the remote client and to receive and display the video data.

11. A computer-readable storage medium having computer-executable instructions stored thereon, which when executed by a computer, cause the computer to:
configure a service processor to
expose a virtual display adapter, through a USB device endpoint at the service processor, to the host computer such that the host computer detects that a video adapter is connected to the host computer through a USB interface,
receive video data, through the USB device endpoint, from the host computer directed toward the virtual display adapter, and
send the video data to a remote client, wherein the service processor is configured to monitor and control aspects of operations of the host computer.

12. The computer-readable storage medium of claim 11, having further computer-executable instructions stored thereon, which when executed by the computer, cause the computer to further configure the service processor to:
write the video data received from the host computer into a memory;
send an acknowledgement to the host computer that the video data has been processed; and
update the video data stored in the memory upon receiving changes in the video data from the host computer.

13. The computer-readable storage medium of claim 11, having further computer-executable instructions stored thereon, which when executed by the computer, cause the computer to further configure the service processor to:
determine whether a host device driver for the virtual display adapter is present on the host computer; and
upon determining that a host device driver for the virtual display adapter is not present on the host computer, to cause the host device driver to be installed on the host computer.

14. The computer-readable storage medium of claim 11, having further computer-executable instructions stored thereon, which when executed by the computer, cause an installer application to be executed on the host computer from a non-volatile memory in the service processor, the installer application configured to install the host device driver on the host.

15. The computer-readable storage medium of claim 11, having further computer-executable instructions stored thereon, which when executed by the computer, cause the computer to further configure the service processor to:
receive a descriptor from the host computer; and
send the descriptor to the remote client prior to sending the video data.

16. A computer-implemented method for redirecting video data from a host computer using a service processor, comprising:
utilizing a service processor to expose a virtual display adapter, through a USB device endpoint at the service processor, to the host computer;
to receive, through the USB device endpoint, video data for the virtual display adapter from the host computer; and
to send the video data received from the host computer to the remote client, wherein the service processor is configured to monitor and control aspects of operations of the host computer.

17. The method of claim 16, further comprising utilizing the service processor to:
write the video data received from the host computer into a frame buffer;
establish a connection with a remote client, such that the remote client can receive the video data;
send the video data stored in the frame buffer to the remote client; and
upon receiving updated video data from the host computer, to update the frame buffer with the updated video data.

18. The method of claim 16, further comprising utilizing the service processor to:
receive a descriptor from the host computer; and
send the descriptor to the remote client prior to sending the video data.

19. The method of claim 18, wherein the descriptor comprises resolution information and color information for the virtual display adapter.

20. The method of claim 16, further comprising:
performing a device enumeration upon initialization of the host computer;
determining whether the host computer includes a host device driver for a virtual display adapter;
upon determining that the host computer does not include a host device driver for the virtual display adapter, causing the driver to be installed on the host computer; and
upon installing the host device driver on the host computer, establishing a connection between the host device driver on the host computer and the service processor.

* * * * *